(12) United States Patent
Drance et al.

(10) Patent No.: US 11,941,551 B2
(45) Date of Patent: *Mar. 26, 2024

(54) SYSTEMS AND METHODS FOR ACCESSING HOTEL SERVICES USING A PORTABLE ELECTRONIC DEVICE

(71) Applicant: Apple Inc., Cupertino, CA (US)

(72) Inventors: Kaiann Drance, San Jose, CA (US); Stanley Carl Ng, Los Altos, CA (US); Courtnee Westendorf, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,694

(22) Filed: Jan. 20, 2023

(65) Prior Publication Data

US 2023/0186181 A1 Jun. 15, 2023

Related U.S. Application Data

(63) Continuation of application No. 16/898,087, filed on Jun. 10, 2020, now Pat. No. 11,562,302, which is a continuation of application No. 12/571,839, filed on Oct. 1, 2009, now abandoned.

(60) Provisional application No. 61/147,355, filed on Jan. 26, 2009.

(51) Int. Cl.
  *G06Q 10/02* (2012.01)
(52) U.S. Cl.
  CPC .................................. *G06Q 10/02* (2013.01)
(58) Field of Classification Search
  None
  See application file for complete search history.

(56) References Cited

U.S. PATENT DOCUMENTS

| | | |
|---|---|---|
| 5,390,281 A | 2/1995 | Luciw et al. |
| 5,434,777 A | 2/1995 | Luciw |
| 5,477,447 A | 7/1995 | Luciw et al. |
| 5,608,624 A | 3/1997 | Luciw |
| 5,621,903 A | 4/1997 | Luciw et al. |
| 5,625,814 A | 4/1997 | Luciw |
| 5,644,735 A | 7/1997 | Luciw |

(Continued)

FOREIGN PATENT DOCUMENTS

| | | |
|---|---|---|
| JP | 2003278416 | 10/2003 |
| WO | 03029914 | 4/2003 |

OTHER PUBLICATIONS

HospitalityNet.com "Signature RFID' by VingCard + NFC-Compatible Cell Phones Coming to The Hotel Show' Dubai" Jun. 4, 2007 Retrieved: Sep. 5 2017.

(Continued)

*Primary Examiner* — Tonya Joseph
(74) *Attorney, Agent, or Firm* — Polsinelli PC

(57) ABSTRACT

This is directed to systems and methods for integrating hotel services in a single application available to a portable electronic device. Using the single application, a user can access and control hotel services before arriving at the hotel, upon arriving at the hotel, in the hotel room, in the local vicinity, and after leaving the hotel. Such services can include, for example, checking-in and checking out, purchasing in-room dining or in-room entertainment, making reservations at local restaurants or local attractions, scheduling hotel guest reminders, and controlling room setting either within the room or outside of the room.

20 Claims, 12 Drawing Sheets

(56) References Cited

U.S. PATENT DOCUMENTS

| | | |
|---|---|---|
| 5,721,845 A | 2/1998 | James et al. |
| 5,864,844 A | 1/1999 | James et al. |
| 5,978,766 A | 11/1999 | Luciw |
| 7,155,199 B2 | 12/2006 | Zalewski et al. |
| 7,315,823 B2 | 1/2008 | Brondup |
| 7,315,824 B2 | 1/2008 | Chen et al. |
| 2002/0049535 A1 | 4/2002 | Rigo et al. |
| 2002/0077960 A1 | 6/2002 | Kiely et al. |
| 2002/0099665 A1 | 7/2002 | Burger et al. |
| 2003/0065805 A1 | 4/2003 | Barnes |
| 2003/0149576 A1 | 8/2003 | Sunyich |
| 2003/0208386 A1 | 11/2003 | Brondrup |
| 2005/0263653 A1 | 12/2005 | Brown |
| 2006/0280149 A1 | 12/2006 | Kuhl |
| 2007/0050197 A1 | 3/2007 | Efron et al. |
| 2007/0088806 A1 | 4/2007 | Marriott et al. |
| 2007/0176739 A1 | 8/2007 | Raheman |
| 2007/0176820 A1 | 8/2007 | Vidal |
| 2007/0178891 A1 | 8/2007 | Louch et al. |
| 2008/0243561 A1 | 10/2008 | Deygout et al. |
| 2010/0078475 A1 | 4/2010 | Lin et al. |

OTHER PUBLICATIONS

Hotels.com iPhone Application, http://itunes.apple.com/us/app/hotelscom/id284971959?mt=8, accessed Sep. 16, 2010.

SYSTEMS AND METHODS FOR ACCESSING HOTEL SERVICES USING A PORTABLE ELECTRONIC DEVICE

CROSS-REFERENCE TO RELATED APPLICATIONS

This application is a Continuation of U.S. patent application Ser. No. 16/898,087, filed on Jun. 10, 2020, entitled "Systems and Methods for Accessing Hotel Services Using a Portable Electronic Device," which in turn, is a Continuation of U.S. patent application Ser. No. 12/571,839, filed on Oct. 1, 2009, entitled "Systems and Methods for Accessing Hotel Services Using a Portable Electronic Device," which in turn, claims the benefit of U.S. Provisional Patent Application No. 61/147,355, filed on Jan. 26, 2009, entitled "Systems and Methods for Accessing Hotel Services Using a Portable Electronic Device." All of which are expressly incorporated by reference herein in their entireties.

FIELD OF THE DISCLOSURE

This is directed to providing access to hotel services using a portable electronic device.

BACKGROUND OF THE DISCLOSURE

As travelers stay in hotels or locations other than their homes, many interactions between the travelers and the hotels can take place. For example, a traveler can interact with a hotel to make a reservation, check-in, order room service, control room settings, use a concierge to identify attractions of interest in the vicinity, purchase entertainment options, check-out, and schedule subsequent aspects of a trip (e.g., order a taxi, reserve a rental car, or check-in to a flight). All of these interactions can require distinct actions from the user from different devices or elements. For example, a user can call to make a reservation, check-in in-person upon reaching the hotel, order entertainment using a menu available from a television screen, identify attractions from a telephone or through an in-person conversation with a concierge, and check-out by receiving a receipt slipped underneath the user's door.

Although this combination of approaches for interacting with the hotel and with the available hotel services can be serviceable, it remains cumbersome and requires the hotel to accommodate all of the possible forms of interaction. From a user's perspective, the lack of centralization of interactions with the hotel and with the available hotel services can require more effort from the user wishing to take advantage of hotel services, and perhaps even dissuade the user from using available hotel services (thus at a cost to the hotel).

SUMMARY OF THE DISCLOSURE

This is directed to systems and methods for accessing hotel services through a portable electronic device. In particular, this is directed to providing an integrated application of an electronic device for accessing hotel services in accordance with some embodiments.

In some embodiments, the integrated application can interface with one or more servers associated with the hotel. For example, the electronic device can connect with distinct servers associated with ordering services or goods from the hotel (e.g., room service), and with distinct servers associated with attractions, shops or stores to allow a user to make reservations, make purchases, or access information. As another example, the electronic device can connect with the controls of a hotel room in which the user is staying to configure aspects of the room such as lighting, temperature, audio settings, video settings, bathtub settings, any other suitable room settings, or any combination of the above.

In some embodiments, the integrated application can allow a user to create, access, and modify hotel reservations. In some embodiments, the integrated application can allow a user to remotely check into a hotel, for example, as a user is approaching the hotel in a taxi. In this case, the electronic device can function as a room key. For example, the electronic device can transmit a signal using an appropriate protocol and radio (e.g., Bluetooth signal or other near field communication) to direct a door to be opened. As another example, the electronic device can display a pattern for an optical reader associated with a door. In some embodiments, through the integrated application a user can pre-order room service or other hotels services, control room settings (e.g., lighting, audio settings, video settings, temperature settings, and bath settings). For example, a user can remotely control the room settings, remotely pre-order room service, or both, before arriving at their room. Alternatively or additionally, the electronic device can function as a remote control to allow a user to control room settings and order hotel services while the user is in their room.

In some embodiments, the integrated application can allow a user to view concierge information (e.g., hotel amenities, nearby shops and restaurants, and the like). A user may make reservations and/or purchases at the shops and restaurants through the integrated application. For example, the electronic device can be used to interface with a menu providing access to hotel services (e.g., displayed on the television screen of the user's room, shown on a display of the electronic device, or both). Using the menu, the user can order videos available for purchase, send requests to schedule hotel services (e.g., schedule a wake up call, make an appointment at the hotel spa, reserve a hotel conference room, and the like), or purchase goods using the existing hotel interface. In some embodiments, the integrated application can provide social networking abilities by allowing a user to locate friends and acquaintances (e.g., in the nearby area).

In some embodiments, the integrated application can allow a user to check out remotely (e.g., by displaying their bill and room charges). In some embodiments, the integrated application can provide other post-checkout functions such as allowing a user to access rewards information, allowing a user to request transportation (e.g., to and/or from an airport), providing bounceback offers, and storing travel receipts (e.g., so a user can be reimbursed for travel expenses).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
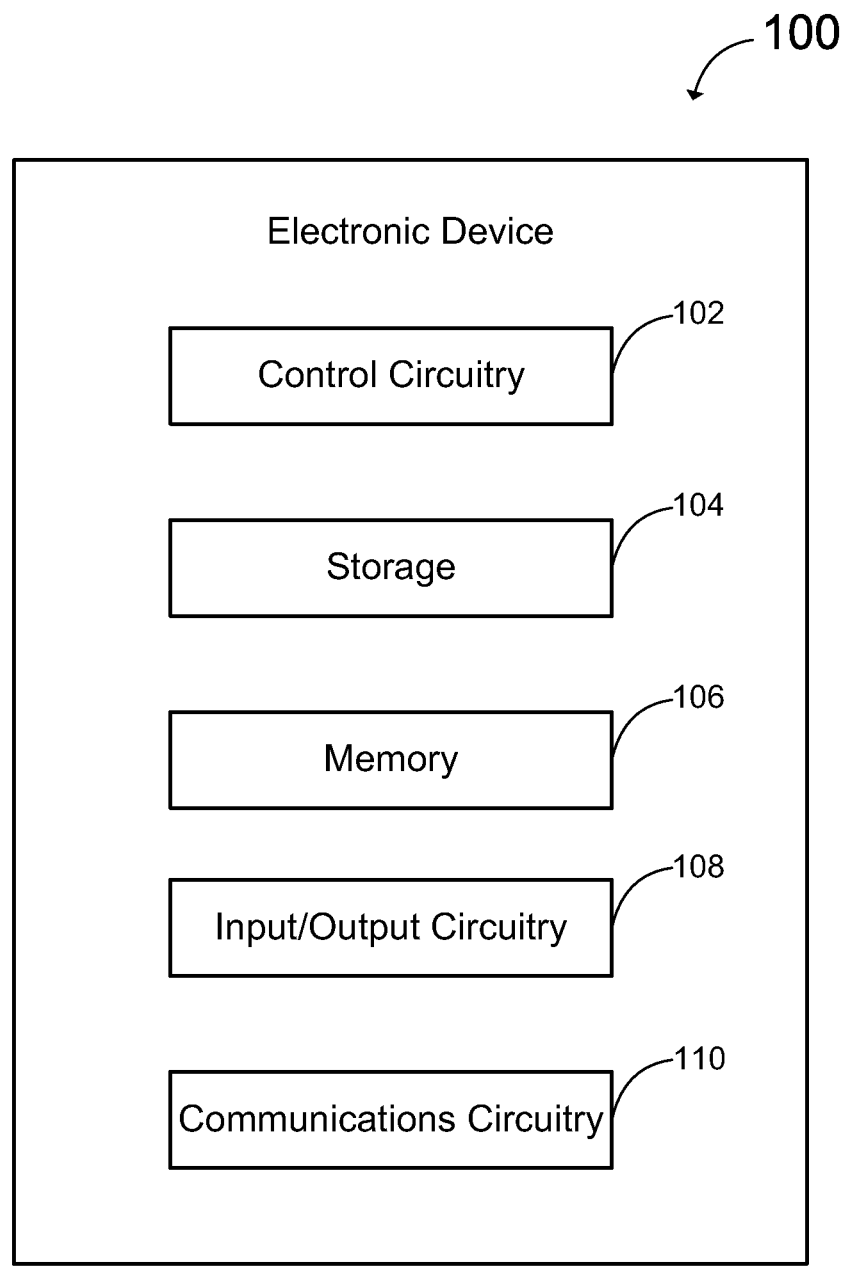
FIG. 1 is a schematic view of an illustrative electronic device for providing an application operative to interface with a hotel system in accordance with some embodiments of the invention.

FIG. 1 is a schematic view of an illustrative electronic device for providing an application operative to interface with a hotel system in accordance with some embodiments of the invention. Electronic device 100 can include control circuitry 102, storage 104, memory 106, I/O circuitry 108 ("I/O circuitry 108"), and communications circuitry 110. In some embodiments, one or more of the components of electronic device 100 can be combined or omitted (e.g., storage 104 and memory 106 can be combined). In some embodiments, electronic device 100 can include other components not combined or included in those shown in FIG. 1 (e.g., motion detection components, a power supply such as a battery or kinetics, a display, a bus, a positioning system, or an input mechanism), or several instances of the components shown in FIG. 1. For the sake of simplicity, only one of each of the components is shown in FIG. 1.

Electronic device 100 can include any suitable type of electronic device. For example, electronic device 100 can include a portable electronic device that the user may hold in his or her hand, such as a digital media player (e.g., an iPod™ made available by Apple Inc. of Cupertino, CA), a personal e-mail device (e.g., a Blackberry™ made available by Research in Motion of Waterloo, Ontario), a personal data assistant ("PDA"), a cellular telephone, a handheld gaming device, and a digital camera. As another example, electronic device 100 can include a larger portable electronic device, such as a laptop computer. As yet another example, electronic device 100 can include a substantially fixed electronic device, such as a desktop computer.

Control circuitry 102 can include any processing circuitry or processor operative to control the operations and performance of electronic device 100. For example, control circuitry 102 can be used to run operating system applications, firmware applications, media playback applications, media editing applications, or any other application. In some embodiments, control circuitry 102 can drive a display and process inputs received from a user interface.

Storage 104 can include, for example, one or more storage mediums including a hard-drive, solid state drive, flash memory, permanent memory such as ROM, any other suitable type of storage component, or any combination thereof. Storage 104 can store, for example, media data (e.g., music and video files), application data (e.g., for implementing functions on electronic device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that can enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that can be stored in storage 104. In some embodiments, memory 106 and storage 104 can be combined as a single storage medium.

I/O circuitry 108 can be operative to convert (and encode/decode, if necessary) analog signals and other signals into digital data. In some embodiments, I/O circuitry 108 can also convert digital data into any other type of signal, and vice-versa. For example, I/O circuitry 108 can receive and convert physical contact inputs (e.g., from a multi-touch screen), physical movements (e.g., from a mouse or sensor), analog audio signals (e.g., from a microphone), or any other input. The digital data can be provided to and received from control circuitry 102, storage 104, memory 106, or any other component of electronic device 100. Although I/O circuitry 108 is illustrated in FIG. 1 as a single component of electronic device 100, several instances of I/O circuitry 108 can be included in electronic device 100.

Electronic device 100 can include any suitable interface or component for allowing a user to provide inputs to I/O circuitry 108. For example, electronic device 100 can include any suitable input mechanism, such as for example, a button, keypad, dial, a click wheel, or a touch screen. In some embodiments, electronic device 100 can include a capacitive sensing mechanism, or a multi-touch capacitive sensing mechanism.

In some embodiments, electronic device 100 can include specialized output circuitry associated with output devices such as, for example, one or more audio outputs. The audio output can include one or more speakers (e.g., mono or stereo speakers) built into electronic device 100, or an audio component that is remotely coupled to electronic device 100 (e.g., a headset, headphones or earbuds that can be coupled to communications device with a wire or wirelessly).

In some embodiments, I/O circuitry 108 can include display circuitry (e.g., a screen or projection system) for providing a display visible to the user. For example, the display circuitry can include a screen (e.g., an LCD screen) that is incorporated in electronics device 100. As another example, the display circuitry can include a movable display or a projecting system for providing a display of content on a surface remote from electronic device 100 (e.g., a video projector). In some embodiments, the display circuitry can include a coder/decoder (Codec) to convert digital media data into analog signals. For example, the display circuitry (or other appropriate circuitry within electronic device 100) can include video Codecs, audio Codecs, or any other suitable type of Codec.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 102. Alternatively, the display circuitry can be operative to provide instructions to a remote display.

Communications circuitry 110 can include any suitable communications circuitry operative to connect to a communications network and to transmit communications (e.g., voice or data) from electronic device 100 to other devices within the communications network. Communications circuitry 110 can be operative to interface with the communications network using any suitable communications protocol such as, for example, Wi-Fi (e.g., a 802.11 protocol), Bluetooth®, radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol.

In some embodiments, communications circuitry 110 can be operative to create a communications network using any suitable communications protocol. For example, communications circuitry 110 can create a short-range communications network using a short-range communications protocol to connect to other devices. For example, communications circuitry 110 can be operative to create a local communications network using the Bluetooth® protocol to couple electronic device 100 with a Bluetooth® headset.

Electronic device 100 can include one more instances of communications circuitry 110 for simultaneously performing several communications operations using different communications networks, although only one is shown in FIG. 1 to avoid overcomplicating the drawing. For example, electronic device 100 can include a first instance of communications circuitry 110 for communicating over a cellular network, and a second instance of communications circuitry 110 for communicating over Wi-Fi or using Bluetooth®. In some embodiments, the same instance of communications circuitry 110 can be operative to provide for communications over several communications networks.

In some embodiments, electronic device 100 can be coupled a host device for data transfers, synching the communications device, software or firmware updates, providing performance information to a remote source (e.g., providing riding characteristics to a remove server) or performing any other suitable operation that can require electronic device 100 to be coupled to a host device. Several electronic devices 100 can be coupled to a single host device using the host device as a server. Alternatively or additionally, electronic device 100 can be coupled to several host devices (e.g., for each of the plurality of the host devices to serve as a backup for data stored in electronic device 100).

In some embodiments, an electronic device (e.g., electronic device 100 of FIG. 1) may include an application operative to interface with a hotel system to provide access to different services provided by the hotel. In some embodiments, this access to the different hotel service can be provided through a single, integrated application of the electronic device. For example, through the integrated application, a user can connect to a hotel registration system to allow a user to check-in and check-out remotely (e.g., from a taxi on the way to the hotel). As another example, the integrated application can allow the user to access services available to hotel guests, such as a concierge service, room service, or other services for enhancing a user's hotel experience. As a further example, the integrated application can allow a user to access and control room settings such as lighting, heat, audio settings, video settings, and bath settings. In some embodiments, the electronic device can allow a user to access the settings, services, or both remotely (e.g., by functioning as a remote control). Also, in addition to hotels, it is to be understood that a user can make use of a single, integrated application in the context of any other type of travel experience, in accordance with other embodiments of the invention.

The electronic device can interface with the hotel system using any suitable approach. In some embodiments, the electronic device can securely connect to one or more servers associated with the hotel. For example, the electronic device can connect with distinct servers associated with ordering services or goods from the hotel (e.g., room service). As another example, the electronic device can connect with distinct servers associated with attractions, shops, or store, for which the user can make reservations, purchases, or access information (e.g., replacing the introduction binder typically found in hotel rooms). As another example, the electronic device can connect with the controls of a hotel room in which the user is staying to configure aspects of the room such as lighting, temperature, audio settings, video settings, bathtub settings, any other suitable room settings, or any combination of the above.

Accordingly, through an integrated application of an electronic device, a user can perform different operations to enhance the user's hotel experience.

Figure 2:
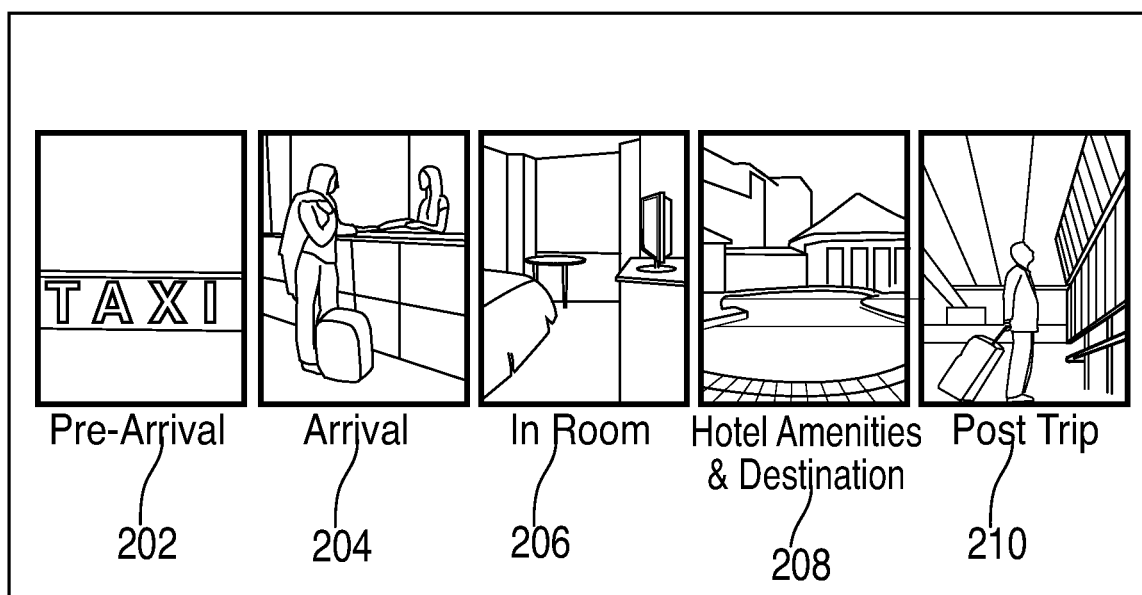
FIG. 2 is a schematic view of several situations during which a user can make use of a single, integrated application in the context of a hotel stay in accordance with some embodiments of the invention.

FIG. 2 shows diagram 200 of several situations during which a user can make use of a single, integrated application in the context of a hotel stay. These situations may include, for example, pre-arrival scenario 202 before a user has checked into a hotel (e.g., while planning the reservation, traveling to the hotel, or both). Other situations can include arrival scenario 204 when a user initially arrives at a hotel, in-room scenario 206 when a user is in their room, and hotel amenities and destination scenario 208 (e.g., when a user is taking part in hotel amenities such as hotel restaurants and bars, when a user is visiting local destination attractions such museums, shows, and restaurants outside of the hotel, and the like). Another situation can include post trip scenario 210 after a user has checked-out of a hotel.

Figure 3:
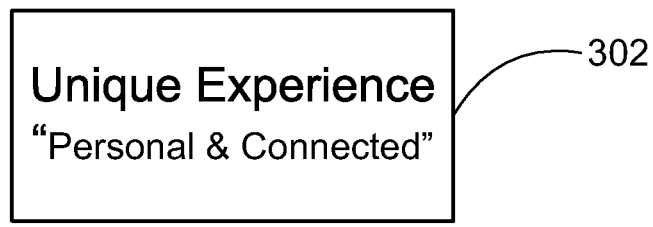
FIG. 3 is a diagram of advantages of an integrated application for enhancing a user's hotel experience in accordance with some embodiments of the invention.
Figure 3:
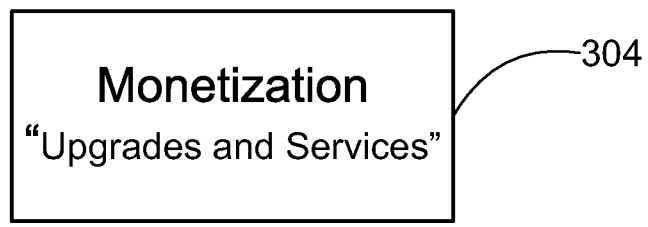
Figure 3:
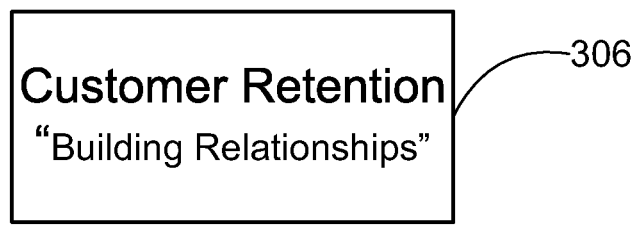
Figure 3:

Advantages of such a single, integrated application can include, as indicated by diagram 300 of FIG. 3, creating a unique experience 302. For example, the integrated application can create a hotel experience that is personal and connected to a shopper (e.g., by promoting continuity with a certain hotel or hotel chain based on a shopper's personal preferences and habits). Advantages of a single, integrated application may also include monetization 304. For example, upgrades and special services that may be purchased by a user can be offered through the integrated application. Another advantage can include customer retention 306. For example, the integrated application can build customer relations and promote customer retention (e.g., by addressing a traveler's needs 24 hours a day and 7 days a week to provide the utmost satisfaction). Yet another advantage can include affiliate opportunities 308. For example, since a portable electronic device's simplicity, affordability, and portability may appeal to a broad scope of travelers, a broad scope of travelers may be using the integrated application. Affiliate companies may then be given the opportunity to reach this wide range of travelers through the integrated application. In this manner, a single, integrated application can control and enhance the user's experience with that hotel.

Figure 4A:
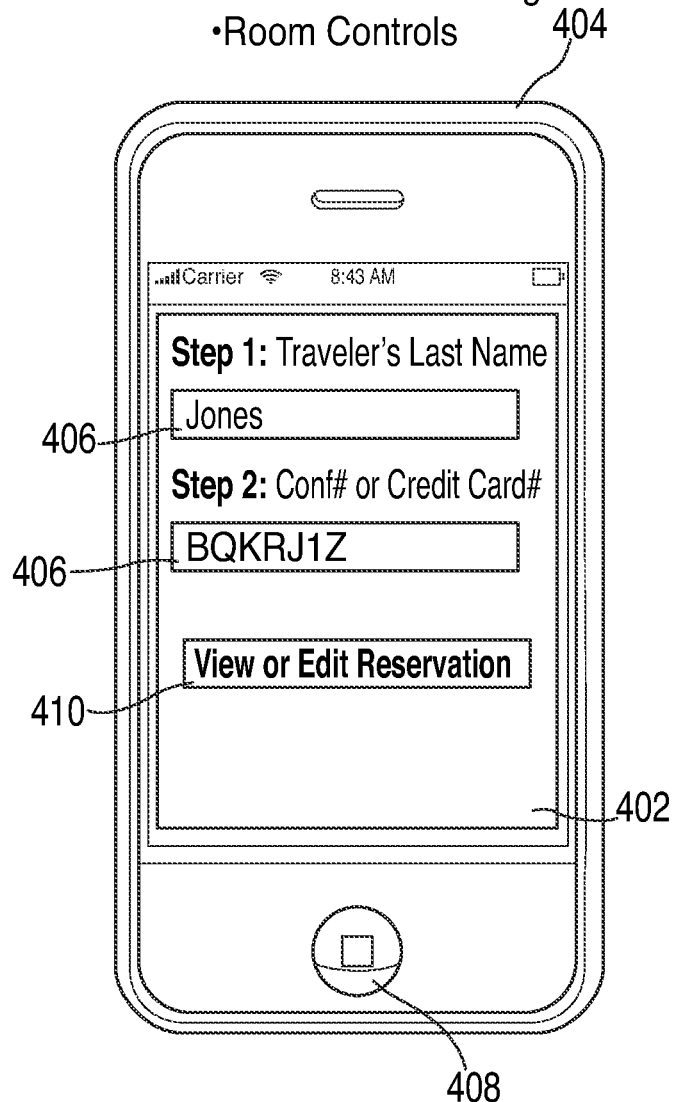
FIGS. 4A and 4B are schematic views of functions available to a user before arrival in accordance with some embodiments of the invention.

FIG. 4A shows diagram 400 of functions available to a user before arriving at a hotel in accordance with some embodiments of the invention. For example, the functions of FIG. 4A may be available to a user during pre-arrival scenario 202 of FIG. 2 and may be used to initiate contact with the guest. However, one skilled in the art could appreciate that the functions of FIG. 4A are not limited to a pre-arrival scenario or to the particular functions listed in FIG. 4A, and rather may include any suitable functions or be used in any suitable scenario.

As generally indicated in diagram 400, a user can create, access, and modify hotel reservations through an integrated application of the user's electronic device. For example, interface 402 shows an exemplary interface to allow a user to access a hotel reservation through electronic device 404. As one illustration, a user can enter identifying information in one or more input boxes 406. The information can be entered through any suitable input component such as input 408. The user's hotel reservation can then be accessed (e.g., for viewing, editing, or for any other suitable function) by selecting input 410. In some embodiments, an integrated application can aid a user in booking a hotel reservation by allowing a user to, for example, browse available hotels, view hotel information, or otherwise suitably be presented with various options and information regarding a hotel reservation. In some embodiments, the integrated application can aid in destination planning by providing local area information (e.g., information about local restaurants, shops, and attractions). The provided information can be free or can be available for purchase (e.g., tour guide books available for purchase). For example, a user can perform a secure transaction through the integrated application (e.g., by using a credit card) to purchase the information.

As is also generally indicated in diagram 400, a user can be provided with upsell opportunities through the integrated application. For example, a user can be provided with an opportunity to upgrade their room, purchase pre-paid meals (e.g., pre-pay for breakfast at the hotel), or purchase any other suitable upsell opportunities. The upsell opportunities can be delivered to the user in any suitable manner such as, for example, an e-mail sent to the user's e-mail account, a pop-up notification, a push notification (e.g., a notification that utilizes an internet protocol ("IP") connection to forward notifications from the servers of third party applications to an electronic device), or any combination of the above.

In some embodiments, a user can remotely check-in and/or check-in early through the integrated application. For example, a hotel system can detect when a user who is scheduled to check into the hotel on the current date is approaching the hotel. In some embodiments, the user's electronic device can include a positioning system with which the hotel system can communicate to determine the user's location. The positioning system can include any suitable system such as, for example, a global positioning system ("GPS") receiver for accessing a GPS application function call that returns the geographic coordinates (i.e., the geographic location) of the electronic device. As another illustration, the positioning system can utilize any suitable trilateration or triangulation technique to determine the geographic coordinates of the electronic device. In some embodiments, the positioning system can determine various measurements (e.g., signal-to-noise ratio ("SNR") or signal strength measurements) of a network signal (e.g., a cellular telephone network signal, a wireless network access point or "hot spot," or any other suitable network signal) associated with the electronic device to determine its location.

Figure 4B:
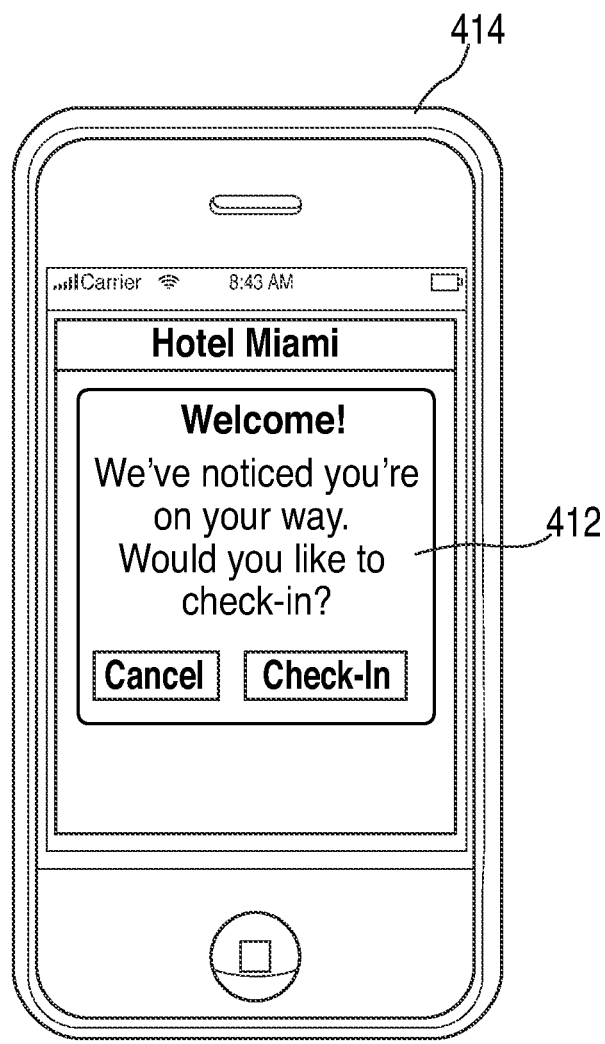

Accordingly, by determining the user's current location (e.g., through a positioning system of the user's electronic device), the hotel system can determine when the user is approaching the hotel. In response to determining the user is nearby (e.g., within a predetermined distance of the hotel), the hotel system may automatically check-in the user. Alternatively, the hotel system can send a notification to the user requesting permission to check-in the user when the hotel system determines the user is within a predetermined distance of the hotel. For example, FIG. 4B shows notification 412 that can be provided via electronic device 414 to request permission to check-in a user. Notification 412 can include, for example, a pop-up notification, a push notification, or any other suitable notification provided via electronic device 414.

As generally indicated by diagram 400, a user can pre-order in-room dining (e.g., room service) or request any other suitable hotel services through the integrated application. For example, oftentimes a user may be arriving at a hotel during late or unusual hours (e.g., due to a long travel time, traveling to a different time zone, or both). Accordingly, local restaurants and hotel restaurants may already be closed when the user arrives at the hotel. Thus an arriving guest, who may potentially be tired and hungry from traveling, may be unable to order food. Through them integrated application of the user's device, however, a user can pre-order a room service item while the room service is still available. The room service item may then be delivered to the user's room. For example, the room service item can be delivered to the user's hotel room prior to the user's arrival. In this manner, the room service order can be ready and waiting for the user when he arrives at his room. Alternatively or additionally to a room service order, any other suitable hotel service can be pre-ordered.

In some embodiments, a user can remotely control room settings of their hotel room through the integrated application. The room settings can include, for example, temperature settings, audio settings (e.g., radio), video settings (e.g., television, movies, and the like), light settings, bath settings (e.g., filling up a bathtub with water at a desired temperature), or any other suitable room settings. For example, the electronic device can be used to interface with a menu providing access to the room settings. Using the menu, the user can suitably configure the room settings as desired when the user is not in the room (e.g., the user can turn on the air conditioning in the room in order that the room has cooled down by the time the user checks-in and arrives at the hotel room). One skilled in the art could appreciate that the room settings can be remotely configured at any suitable time, and is not limited to the timeframe before a user initially checks-in. For example, a user may have already checked into a hotel, yet has left the hotel room for the day (e.g., to go skiing, to go to work, and the like). On the way back to the hotel room, a user can remotely configure the room settings to increase the temperature in the hotel room, (e.g., since the user may be cold from skiing all day). In this manner, the hotel room may already be warmed by the time the user arrives at the hotel room.

Figure 5:
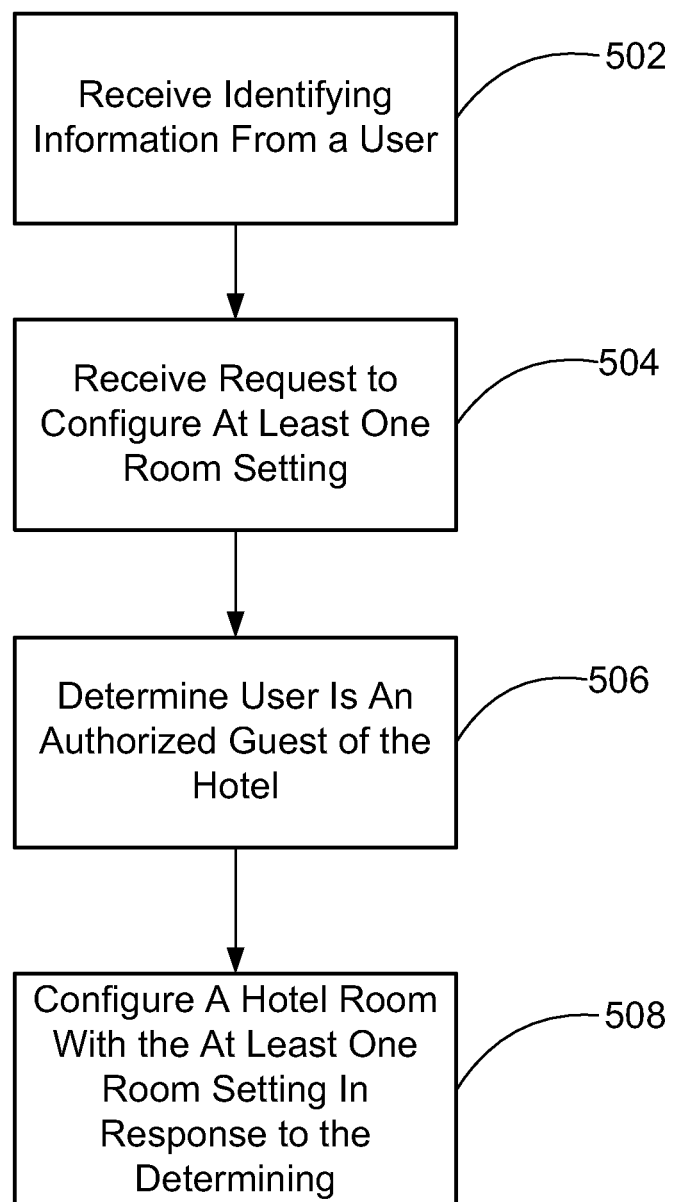
FIG. 5 is an illustrative process for configuring a room setting in accordance with some embodiments of the invention.

FIG. 5 shows process 500 for configuring a room setting. At step 502, identifying information can be received from the user. For example, the identifying information can be received by a server of the hotel system. The identifying information can include a credit card number, a hotel reservation number, the user's name, the user's birth date, the user's social security number, the user's login information (e.g., to log into a server of the hotel system), any other suitable identifying information, or any combination of the above. The information can be transmitted by, for example, communication circuitry of an electronic device of the user (e.g., communication circuitry 110 of FIG. 1) to the hotel system.

At step 504, a request to configure at least one room setting can be received from the user. Similar to step 502, the request can be received by, for example, a server of the hotel system. The room setting requested for configuration can include a temperature setting, an audio setting, a video setting, a light setting, a bath setting, any other suitable room setting, or any combination of the above. In some embodiments, the request can include a certain timeframe in which to complete the request (e.g., "turn on the room lights in 15 minutes."). In this manner, a user can time a room setting configuration to occur at a desired time such as, for example, shortly before the user arrives at the hotel room (e.g., in order to save electricity).

At step 506, the hotel system can determine whether the user is an authorized guest of the hotel (e.g., and thus may be authorized to configure a room setting). For example, based on the identifying information received at step 502, the hotel system can determine whether the user is currently checked into the hotel. As another example, based on the identifying information received at step 502, the hotel system can determine whether the user is scheduled to check into the hotel on the current date. In some embodiments, in response to determining the user is scheduled to check into the hotel on the current date but is not yet checked in, the hotel system can automatically check the user into the hotel. Alternatively, in this scenario, the hotel can send a notification to the user requesting permission to check the user into the hotel (e.g., notification 412 of FIG. 4B).

At step 508, in response to determining the user is an authorized guest of the hotel, a hotel room can be configured with the requested room setting that was received at step 504. For example, one or more lights can be turned off or on, the room temperature can be raised or lowered, a radio can be turned on, off, or have its volume adjusted, a television can be turned on, off, or have its volume adjusted, a particular movie can be loaded into an entertainment system (e.g., loaded into a DVD or Blu-ray player), a bathtub can be filled with water of a desired temperature, or any other suitable room settings can be configured as requested.

The particular hotel room whose settings are to be configured can be determined in any suitable manner. For example, if a user is already checked into the hotel, the room settings can be applied to the user's hotel room. If the user is currently being checked into the hotel (e.g., checked in remotely through a suitable interface, such as notification 412 of FIG. 4B), the user can be assigned to a particular room at this time. The room settings may then be applied to this particular room.

Figure 6:
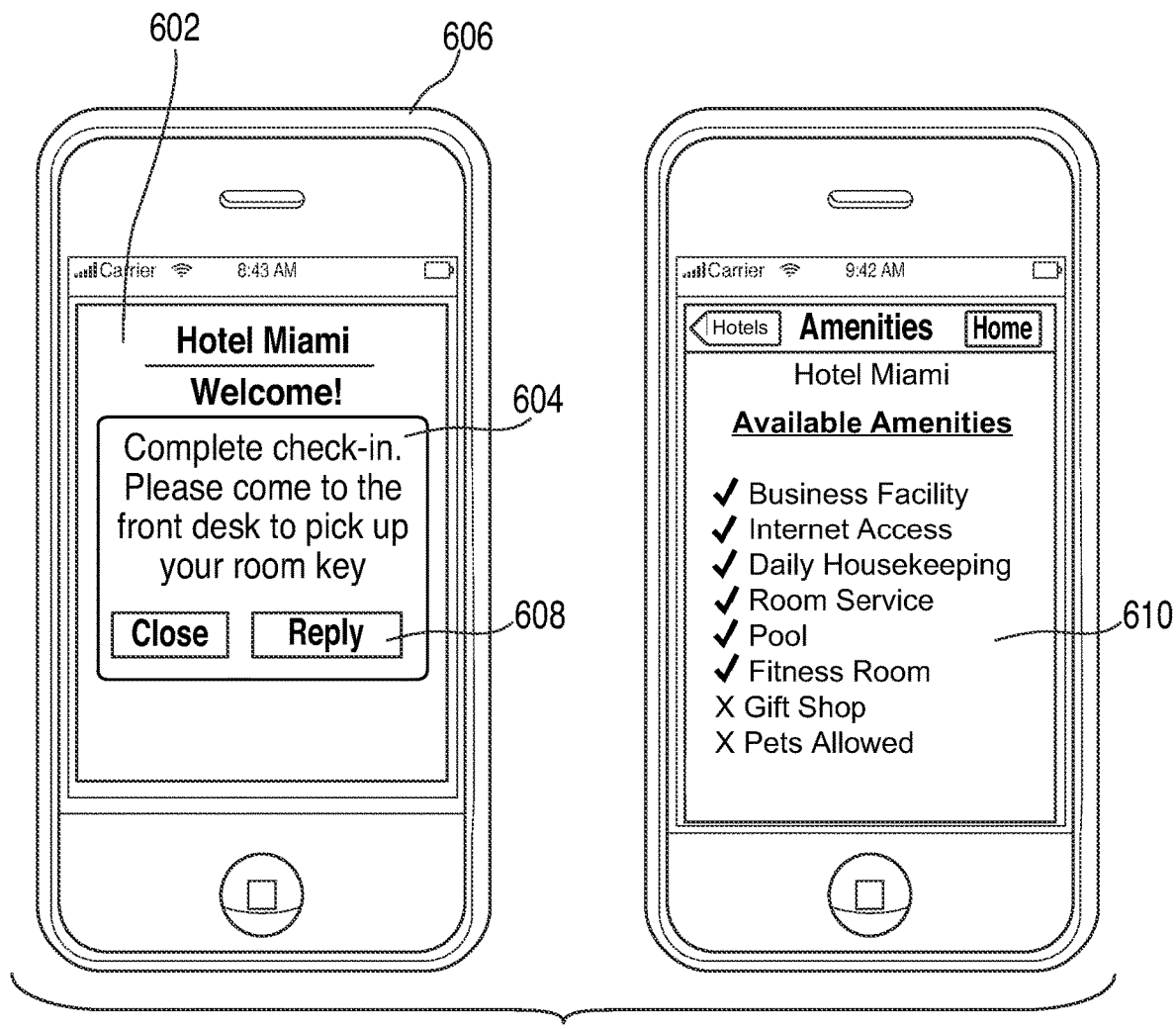
FIG. 6 is a schematic view of functions available to a user upon arriving at a hotel in accordance with some embodiments of the invention.

FIG. 6 shows diagram 600 of functions available to a user upon arriving at a hotel in accordance with some embodiments of the invention. For example, the functions of FIG. 6 may be available to a user during arrival scenario 204 of FIG. 2. However, one skilled in the art could appreciate that the functions of FIG. 6 are not limited to an arrival scenario or to the particular functions listed in FIG. 6, and rather may include any suitable functions or be used in any suitable scenario.

As generally indicated in diagram 600, a user can complete a check-in through the integrated application. For example, as illustrated by user interface 602, a notification such as notification 604 can be received on the user's electronic device 606. The notification can include information such as information on where to pick up a room key, an arrival confirmation, an option such as option 608 to allow the user to reply to the notification or otherwise communicate with the hotel, or any other suitable information.

In some embodiments, the electronic device itself can function as a room key. For example, the electronic device can transmit a signal using an appropriate protocol and radio signal (e.g., RFID signal or other near field communication) to direct a hotel room door to be opened. As another example, the electronic device can display a pattern for an optical reader associated with a hotel room door. The electronic device can receive the appropriate electronic key at any suitable time, including for example upon checking-in remotely (e.g., through notification 412 of FIG. 4). In this scenario, the key can be securely transmitted to the electronic device through, for example, a secure wireless network. As an illustration, this may allow a user to proceed directly to their room rather than necessitating a trip to the front desk to pick up their room key.

As is also generally indicated by diagram 600, a user can view hotel amenities through the integrated application. For example, interface 610 shows an exemplary user interface for showcasing hotel amenities. In addition to hotel amenities, a user can view and browse local restaurants, shops, attractions, and other suitable services that are nearby the hotel. For example, an integrated or associated mapping application can be used to allow a user to search and browse the local services. In some embodiments, a user can make reservations, purchases, or both at any suitable hotel and local shops, restaurants, attractions, or other services. For example, the electronic device can provide for a secure connection to allow a user to transmit payment information (e.g., credit card information), or a reservations (e.g., restaurant reservation) can be made over a wireless network, thus removing the need for a user to telephone the restaurant.

In some embodiments, as is also indicated by diagram 600, a user can find social acquaintances in the vicinity through the integrated application. For example, a friend's electronic device can include a positioning system to determine the friend's location. The friend's electronic device can then transmit this location information to the user's electronic device. In response to determining that a friend is vicinity, the integrated application may notification to the user that the friend in the nearby then provide a is nearby, display a map showing the location of the friend, provide contact information for the friend (e.g., from a address book stored on or accessible by the electronic device), or any combination of the above.

Figure 7:
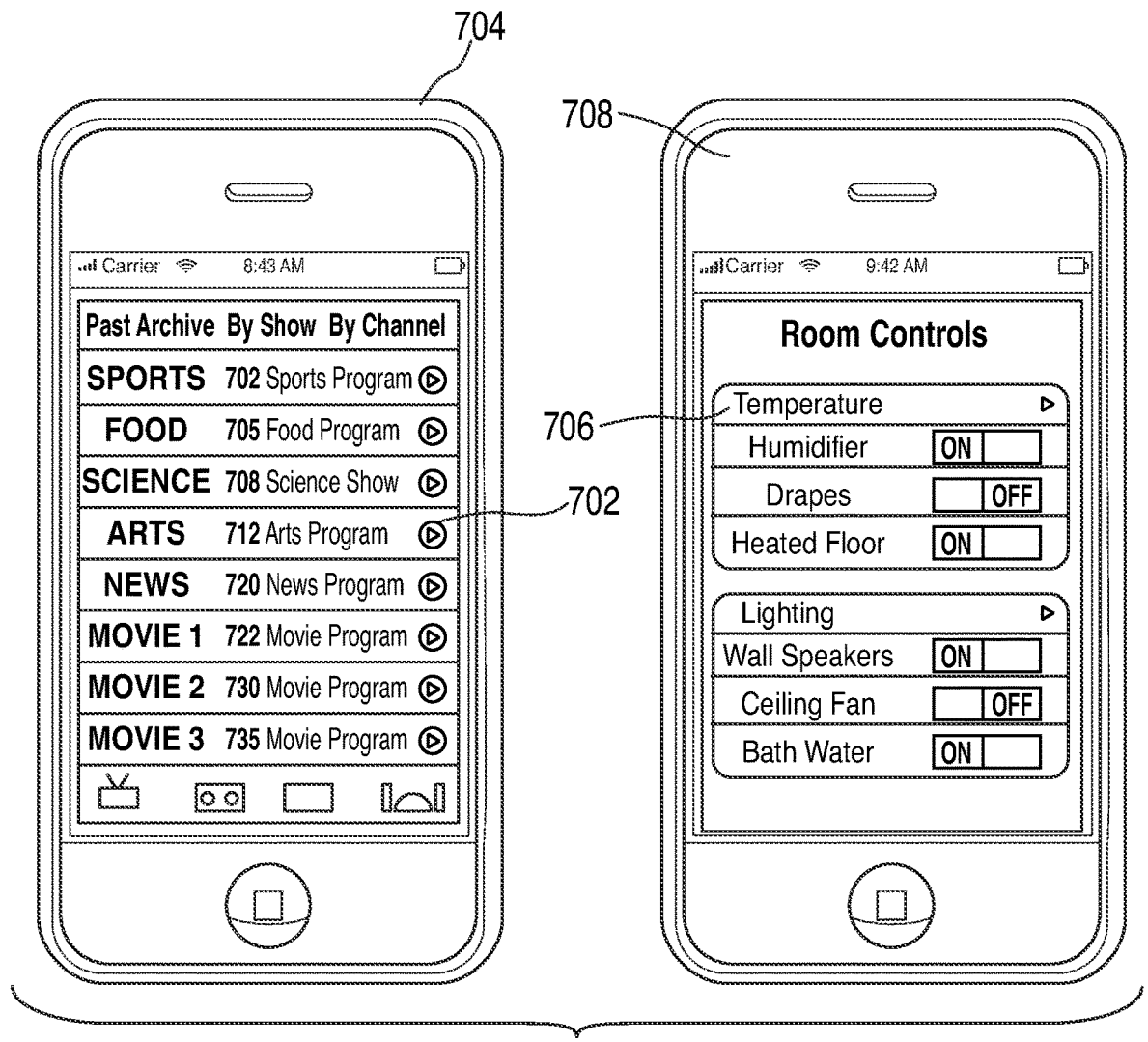
FIG. 7 is a schematic view of functions available to a user within the hotel room in accordance with some embodiments of the invention.

FIG. 7 shows diagram 700 of functions available to a user within the hotel room in accordance with some embodiments of the invention. For example, the functions of FIG. 7 may be available to a user during in-room scenario 206 of FIG. 2. However, one skilled in the art could appreciate that the functions of FIG. 7 are not limited to an in-room scenario or to the particular functions listed in FIG. 7, and rather may include any suitable functions or may be used in any suitable scenario.

As shown in diagram 700, a user can control power, audio, and video available in the room and enhance room settings. For example, through the integrated application, the electronic device can function as a universal remote controller allowing a user to control audio and video available for playback. For example, interface 702 shows an exemplary interface allowing a user to control the channels of a television through electronic device 704. Through interface 702, a user can additionally or alternatively control a radio, a DVD player, a CD player, a coffee maker, or any other suitable electronics and appliances within the hotel room.

As another illustration, through the integrated application, the electronic device can function as a universal remote to control room settings. For example, a user can control light switches, bathroom appliances or fixtures (e.g., start a bath with water at a user defined temperature), temperature settings, or the settings of other appliances of the hotel room. For example, interface 706 shows an exemplary interface allowing a user to control room settings through electronic device 708. One skilled in the art could appreciate that interface 706 may also allow a user to control room settings when they outside of the hotel room or are in a location outside of the hotel premises.

Figure 8:
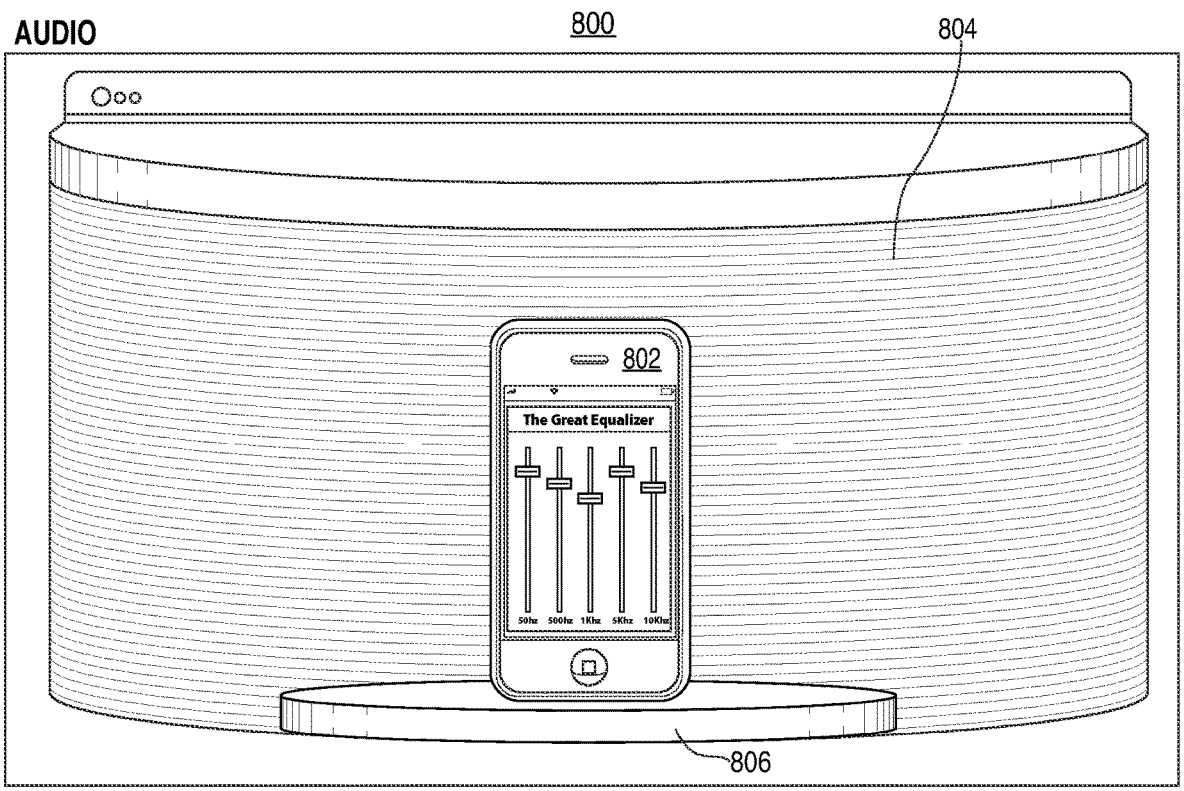
FIG. 8 is a schematic view of an electronic device integrated in an audio system in accordance with some embodiments of the invention.
Figure 9:
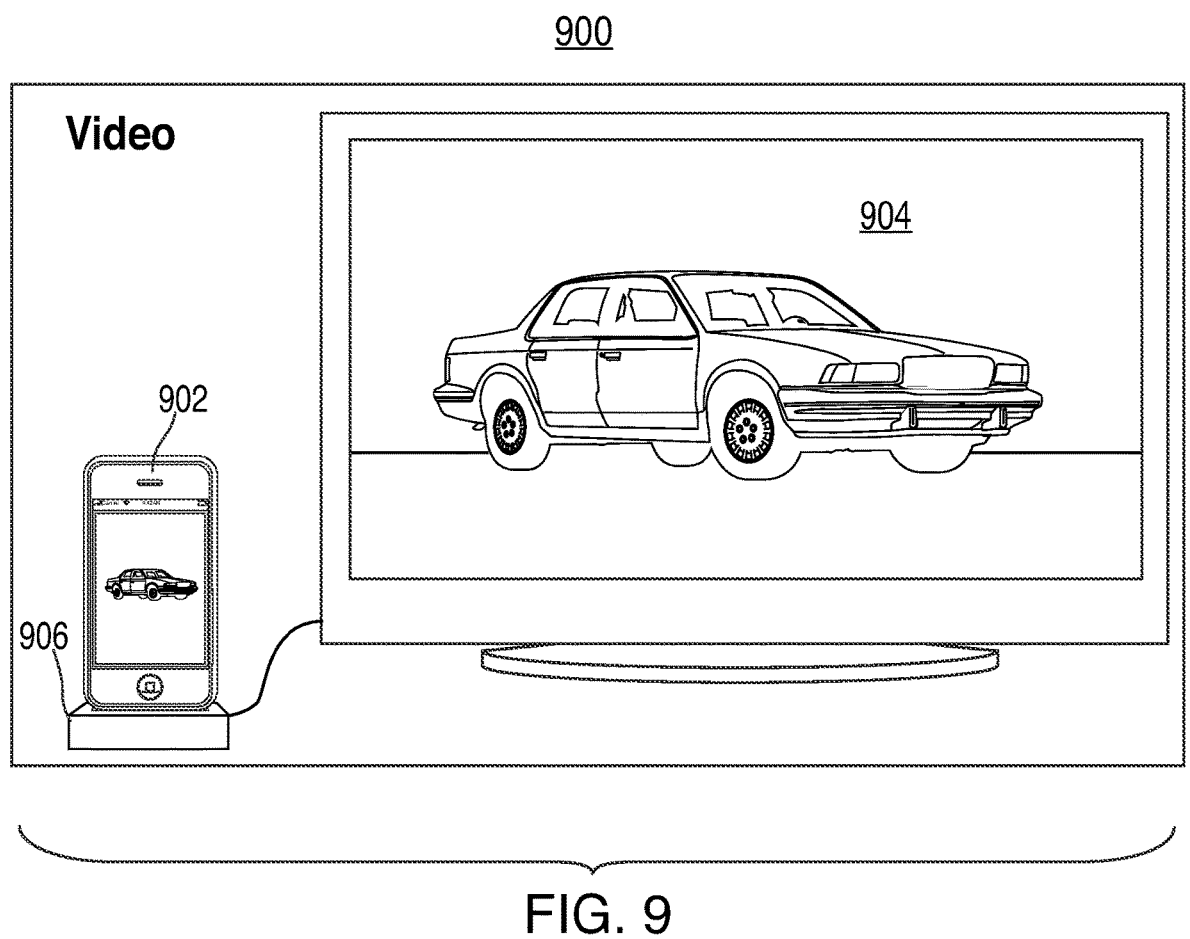
FIG. 9 is a schematic view of an electronic device integrated in a video system in accordance with some embodiments of the invention.

In some embodiments, in addition to or instead of using the electronic device a universal remote controller, a user can connect the electronic device to a dock for providing audio playback, video playback, or both. For example, FIG. 8 shows audio system 800. In audio system 800, electronic device 802 can couple to one or more of speaker 804 through dock 806. As another example, FIG. 9 shows video system 900. In video system 900, electronic device 902 can couple to one or more video playback systems 904 (e.g., a television, DVD player, Blu-ray player, any other suitable video playback system, or any combination of the above) through dock 906. Through audio system 800 and video system 900, a user can, for example, play video and audio stored on electronic device 902 through video playback system 904 (e.g., play a movie that was half finished on an airplane ride to the hotel).

In some embodiments, the electronic device can be used to interface with a menu providing access to hotel services (e.g., a menu displayed on the television screen of the user's room, displayed on the electronic device, or both). Using the menu, the user can order videos (e.g., movies available for purchase such as movies-on-demand or movies available for free viewing), send requests to the hotel (e.g., schedule a wake up call), or purchase goods (e.g., toiletries, souvenirs, meals, or other goods) using the existing hotel interface. For example, through the menu, a user can browse various media (e.g., movies, music, or other suitable media) available for purchase. The user may then access information such as media title, media description, media price, media genre, or other suitable information. After ordering a media item, the media can be presented to the user through a system such as, for example, audio system 800 of FIG. 8 or audio system 900 of FIG. 9. In some embodiments, a user can specify user preferences and profile information such as, for example, preferred genre, preferred movie length, favorite music, favorite shows, age, gender, or any other suitable information. Based on the user preferences and profile information, the menu items of the electronic device can be personalized for the user. For example, the movies available for purchased can be prioritized such that preferred movies are displayed more prominently (e.g., are displayed at the top of the list, are the only movies displayed, are displayed in bold, and the like). As another example, when the electronic device is being used as a universal remote to control television channels (e.g., interface 702 of FIG. 7), preferred channels can be displayed more prominently. The preferred media and channels can be determined based directly on the user preferences and profile information (e.g., the preferred media matches a preferred genre in the user preferences), may be determined indirectly from user preferences and profile information (e.g., based on the user's age, media generally enjoyed by users of that age group can be chosen), or a combination of the above.

Figure 10:
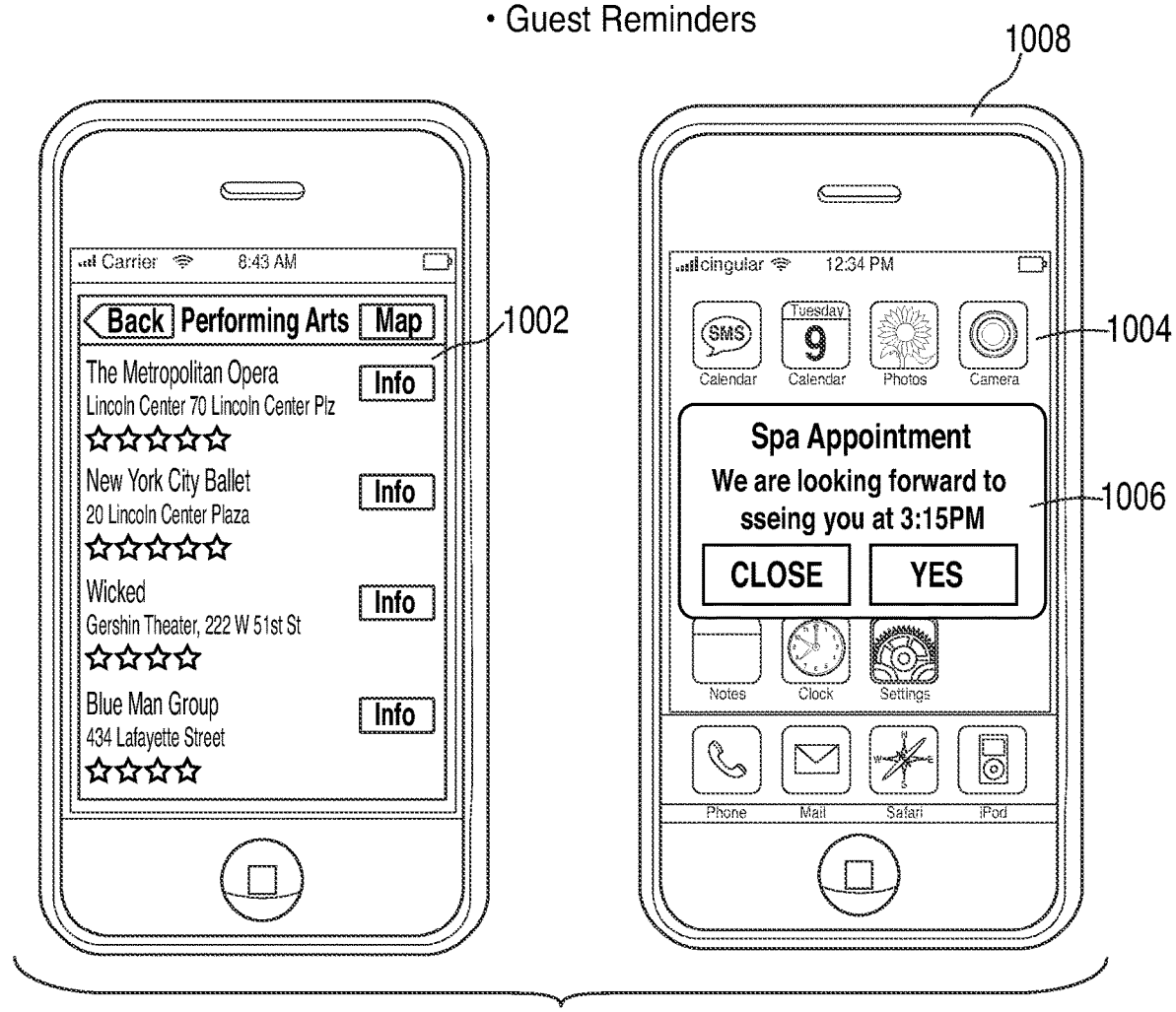
FIG. 10 is a schematic view of functions available to a user for accessing hotel amenities and nearby destinations in accordance with some embodiments of the invention.

FIG. 10 shows diagram 1000 of functions available to a user for accessing hotel amenities and information regarding nearby destinations in accordance with some embodiments of the invention. For example, the functions of FIG. 10 may be available to a user during hotel amenities and destination scenario 208 of FIG. 2. However, one skilled in the art could appreciate that the functions of FIG. 10 are not limited to a hotel amenities and destination scenario or to the particular functions listed in FIG. 10, and rather may include any suitable functions or may be used in any suitable scenario.

As generally indicated in diagram 1000, the user can make restaurant reservations and view restaurant recommendations for local restaurants through the integrated application. Moreover, the user can book hotel amenities and on-site services such as, for example, spa appointments, hotel restaurant reservations, conference room reservations, or any other suitable hotel amenities.

Moreover, in some embodiments, a user can view and browse location based entertainment (e.g., local entertainment) through the integrated application. For example, interface 1002 shows an exemplary user interface for allowing a user to browse local entertainment and attractions. Through an interface such as interface 1002, a user can locate information on local restaurants, movies, theatres, museums, or any other local attractions and entertainment. In this manner, as the location information can be provided through a portable electronic device carried by a user, a user can be provided with a portable and convenient source of "concierge information to go." Moreover, in addition to viewing and browsing local entertainment, a user can make purchases. For example, through a secure network for authorizing payment, (e.g., through a credit card system) a user can purchase movie tickets, sports tickets, museum tickets, show tickets, theme park tickets, or purchase any other suitable items.

As is also generally indicated in diagram 1000, guest reminder can be provided to a user through the integrated application of the electronic device. For example, a reminder such as a wake-up call can be provided through the electronic device (e.g., the electronic device can vibrate, sound an alarm, or otherwise alert a user at the time of the wake-up call). As another example, reminders of scheduled appointments can be provided through the integrated application. For example, user interface 1004 shows an exemplary reminder 1006 that can be provided through electronic device 1008. Reminder 1006 can be provided through any suitable notification such as, for example, an e-mail notification, a phone call, a pop-up notification, a push notification, or any other suitable notification.

Figure 11:
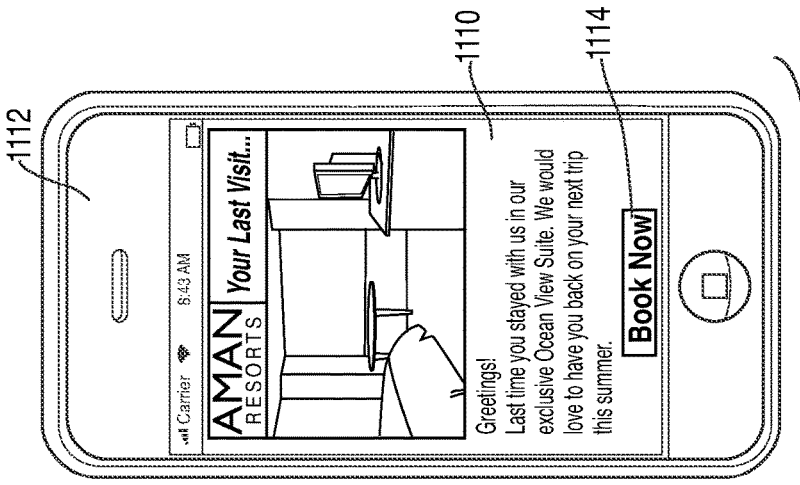
FIG. 11 is a schematic view of functions available to a user after leaving the hotel in accordance with some embodiments of the invention.
Figure 11:
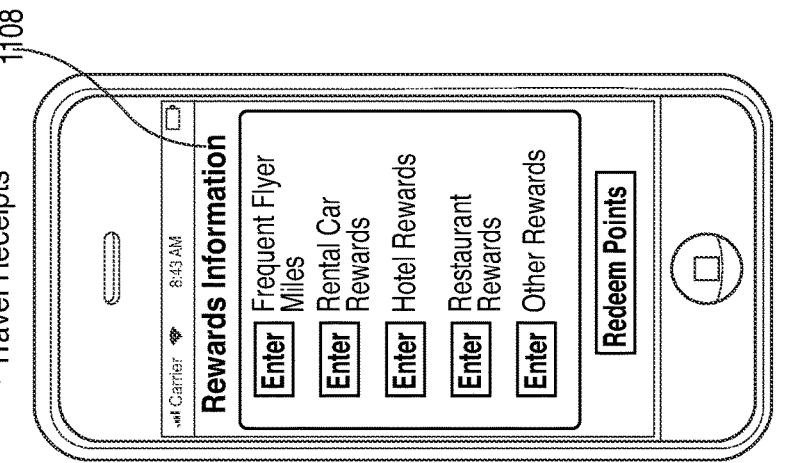
Figure 11:
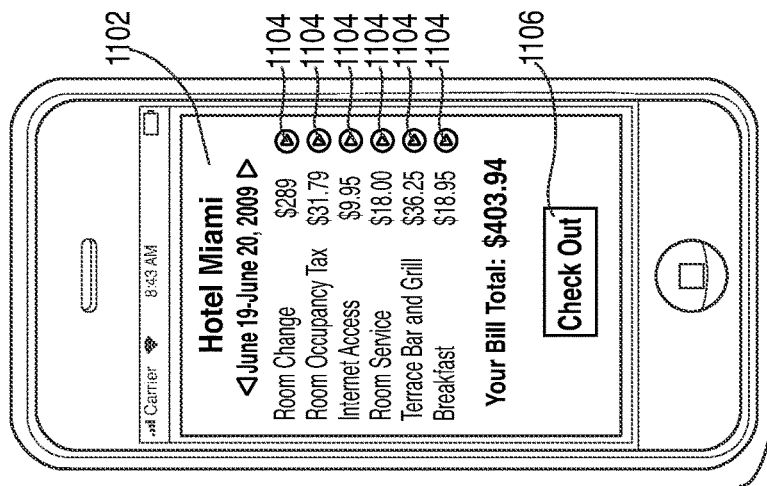

FIG. 11 shows diagram 1100 of functions available to a user after checking out of a hotel in accordance with some embodiments of the invention. For example, the functions of FIG. 11 may be available to a user during post trip scenario 210 of FIG. 2. However, one skilled in the art could appreciate that the functions of FIG. 11 are not limited to post trip scenario or to the particular functions listed in FIG. 11, and rather may include any suitable functions or may be used in any suitable scenario.

As generally indicated in diagram 1100, the user can checkout remotely through an "easy checkout." For example, as illustrated by interface 1102, through the electronic device a user can see information such as their hotel bill and room charges. A user may then access additional or more detailed information regarding room charges by choosing selections such as input 1104. A user may complete a checkout by choosing a suitable option such as input 1106.

Moreover, as is also indicated by diagram 1100, a user can request transportation to a destination (e.g., a taxi to an airport), and view rewards information. For example, as illustrated by user interface 1108, a user can be provided with an opportunity to enter, view, and modify rewards information. In some embodiments, through the integrated application, and user can be provides with offers from affiliate programs, purchase post-trip items (e.g., souvenirs or other memorabilia), and view bounceback offers. For example, FIG. 11 shows illustrative bounceback offer 1110 that can be received by electronic device 1112. A user can accept a bounceback offer through any suitable means such as, for example, through selectable option 1114.

In some embodiments, the electronic device can automatically save and store receipts from the hotel and other service providers (e.g., restaurants, transportation, entertainment, and attractions) to facilitate the user's post-trip experience. For example, the receipts can be gathered to aid a user in updating their budget or to facilitate the reimbursement of expenses incurred on a business trip.

The process discussed above is intended to be illustrative and not limiting. Persons skilled in the art could appreciate that steps of the process discussed herein can be omitted, modified, combined, or rearranged, and any additional steps can be performed without departing from the scope of the invention.

In addition, it will be apparent to those of ordinary skill in the art that methods involved in the invention may be embodied in a computer program product that includes a machine readable and/or usable medium. For example, such a computer usable medium may consist of a read-only memory device, such as a CD ROM disk or conventional ROM device, or a random access memory, such as a hard drive device or a computer diskette, or flash memory device having a computer readable program code stored thereon.

The above-described embodiments of the invention are presented for purposes of illustration and not of limitation.

The invention claimed is:

1. A method comprising:
receiving a first input in a graphical user interface presented by a hotel application executing on a computing device of a user, the hotel application being configured to interface with a hotel computing system of a hotel to control at least one function of an electrical device located in a hotel room during an in-progress reservation, the first input being to control the at least one function of the electrical device;
in response to receiving the first input by the hotel application executing on the computing device of the user, sending a communication by the hotel application to the hotel computing system, the communication identifying the electrical device located in the hotel room and the at least one function; and
receiving a confirmation from the hotel computing system indicating that the hotel room is configured in accordance with the communication to control the at least one function of the electrical device, wherein the hotel computing system confirms the hotel room has been configured after the hotel computing system has determined that the user is an authorized guest of the hotel and a room number assigned to the user.

2. The method of claim 1, wherein the communication to control the at least one function of the electrical device identifies a particular hotel room associated with the in-progress reservation.

3. The method of claim 1, further comprising:
sending by the hotel application a request to order a room service item, the request being sent when the computing device is outside of the hotel room.

4. The method of claim 1, comprising:
configuring, by the hotel application, the computing device as an electronic key, wherein the computing device opens an electronic lock associated with a door of the hotel room.

5. The method of claim 1, wherein the at least one function of the electrical device located in the hotel room is a temperature setting of the hotel room, a television setting of the hotel room, or a lighting setting of the hotel room.

6. The method of claim 1, comprising:
receiving a second input in the graphical user interface presented by the hotel application, the second input is to book a hotel amenity.

7. The method of claim 1, comprising:
presenting, by the hotel application a reminder for a booked hotel amenity.

8. The method of claim 1, comprising:
receiving a second input in the graphical user interface presented by the hotel application, the second input being to interact with concierge services provided through the hotel computing system.

9. A non-transitory computer-readable medium comprising instructions stored thereon, the instructions effective to configure at least one processor to:
receive a first input in graphical user interface presented by a hotel application executing on a computing device of a user, the hotel application being configured to interface with a hotel computing system of a hotel to control at least one function of an electrical device located in a hotel room during an in-progress reservation, the first input being to control the at least one function of the electrical device;
in response to receipt of the first input by the hotel application executing on the computing device of the user, send a communication by the hotel application to the hotel computing system, the communication identifying the electrical device located in the hotel room and the at least one function; and
send a command, by the hotel computing system, to the electrical device to adjust the at least one function of the electrical device located in the hotel room.

10. The non-transitory computer-readable medium of claim 9, wherein the communication to control the at least one function of the electrical device identifies a particular hotel room associated with the in-progress reservation.

11. The non-transitory computer-readable medium of claim 9, the instructions are further effective to configure the at least one processor to:
send by the hotel application a request to order a room service item, the request being sent when the computing device is outside of the hotel room.

12. The non-transitory computer-readable medium of claim 9, the instructions are further effective to configure the at least one processor to:

configure, by the hotel application, the computing device as an electronic key, wherein the computing device opens an electronic lock associated with a door of the hotel room.

13. The non-transitory computer-readable medium of claim 9, wherein the at least one function of the electrical device located in the hotel room is a temperature setting of the hotel room, a television setting of the hotel room, or a lighting setting of the hotel room.

14. The non-transitory computer-readable medium of claim 9, the instructions are further effective to configure the at least one processor to:

receive a second input in the graphical user interface presented by the hotel application, the second input is to book a hotel amenity.

15. The non-transitory computer-readable medium of claim 9, the instructions are further effective to configure the at least one processor to:

present, by the hotel application a reminder for a booked hotel amenity.

16. The non-transitory computer-readable medium of claim 9, the instructions are further effective to configure the at least one processor to:

receive a second input in the graphical user interface presented by the hotel application, the second input being to interact with concierge services provided through the hotel computing system.

17. A system comprising:

at least one processor; and at least one non-transitory storage having instructions stored thereon, the instructions effective to configure the at least one processor to:

receive a first input in graphical user interface presented by a hotel application executing on a computing device of a user, the hotel application being configured to interface with a hotel computing system to control at least one function of an electrical device located in a hotel room during an in-progress reservation, the first input being to control the at least one function of the electrical device;

in response to receipt of the first input by the hotel application executing on the computing device of the user, send a communication by the hotel application to the hotel computing system, the communication identifying the electrical device located in the hotel room and the at least one function; and send a command, by the hotel computing system, to the electrical device to adjust the at least one function of the electrical device located in the hotel room.

18. The system of claim 17, wherein the at least one function of the electrical device located in the hotel room is a temperature setting of the hotel room, a television setting of the hotel room, or a lighting setting of the hotel room.

19. The system of claim 17, the instructions are further effective to configure the at least one processor to:

receive a second input in the graphical user interface presented by the hotel application, the second input is to book a hotel amenity.

20. The system of claim 17, the instructions are further effective to configure the at least one processor to:

receive a second input in the graphical user interface presented by the hotel application, the second input being to interact with concierge services provided through the hotel computing system.

* * * * *